United States Patent [19]
Krüger et al.

[11] 4,362,701
[45] Dec. 7, 1982

[54] ROTATING APPARATUS FOR MANUFACTURING HYDROGEN FLUORIDE

[75] Inventors: Jörg Krüger, Schwandorf; Roland Thome, Bonn; Dieter Moritz, Lünen; Hubert Bings, Lünen; Herbert Losert, Lünen, all of Fed. Rep. of Germany

[73] Assignee: Vereinigte Aluminium-Werke Aktiengesellschaft, Bonn, Fed. Rep. of Germany

[21] Appl. No.: 248,522

[22] Filed: Mar. 27, 1981

Related U.S. Application Data

[62] Division of Ser. No. 198,217, Oct. 17, 1980, Pat. No. 4,294,816.

[30] Foreign Application Priority Data

Oct. 20, 1979 [DE] Fed. Rep. of Germany ....... 2942439

[51] Int. Cl.³ ............................. B01J 4/00; B01J 8/10; B01J 19/28
[52] U.S. Cl. .................................... 422/194; 422/206; 422/209
[58] Field of Search ....................... 422/193, 194, 209; 423/484, 119, 130, 600; 432/106, 109, 110, 111, 117, 118

[56] References Cited

U.S. PATENT DOCUMENTS

| 2,007,121 | 7/1935 | Johannsen | 432/109 |
| 2,187,922 | 1/1940 | West et al. | 432/111 |
| 3,105,744 | 10/1963 | Luethge | 422/209 |
| 3,241,917 | 3/1966 | Lapple | 423/484 |
| 3,580,554 | 5/1971 | Bushvev et al. | 432/117 |
| 4,052,151 | 10/1977 | Reichrt et al. | 432/106 |
| 4,053,365 | 10/1977 | Welter | 422/209 |

Primary Examiner—Bradley Garris
Attorney, Agent, or Firm—Darby & Darby

[57] ABSTRACT

A process for extracting hydrogen fluoride from fluorine containing materials includes countercurrently contacting the materials with steam having a plane of rotation relatively perpendicular to the direction of flow of the material. An apparatus for the extraction of hydrogen fluoride from fluorine containing materials includes a rotary kiln having a first zone wherein a steam-air mixture countercurrently contacts the materials in an oxidation step, a second zone wherein an oxygen containing gas is tangentially injected into the kiln to provide complete combustion of carbon containing materials, a third zone wherein a steam stream countercurrently contacts the materials in a reducing step and means for providing a plane of rotation to the steam which is relatively perpendicular to the direction of flow of the material.

7 Claims, 2 Drawing Figures

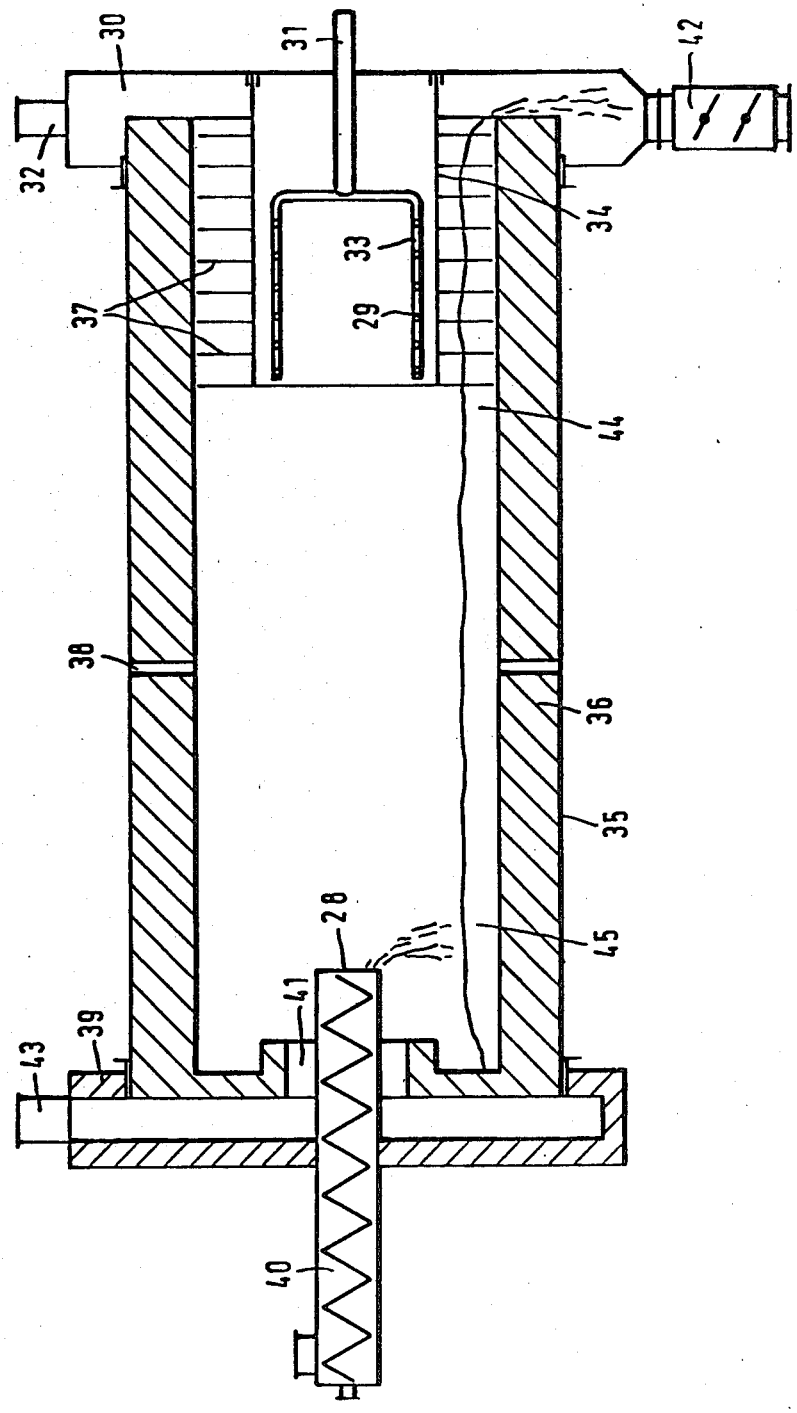

ROTATING APPARATUS FOR MANUFACTURING HYDROGEN FLUORIDE

This is a division, of application Ser. No. 198,217, filed Oct. 17, 1980 now U.S. Pat. No. 4,294,846.

The invention relates to a process for producing hydrogen fluoride from fluorine-containing solid materials by continuous pyrohydrolysis at temperatures above 600° C., wherein a heated stream of fluorine containing materials is subjected to high steam partial pressure in a rotary kiln.

The pyrohydrolysis of fluorine-containing materials in a rotating pipe reactor can be carried out economically under certain conditions. Fluorine containing materials suitable for use in the present process include the waste products in aluminum electrolysis. The principle components of this material are carbon, $Al_2O_3$, $Na_2O$ and fluorine. The reaction must be carried out within a narrow temperature range; at temperatures which are too low, the reaction is incomplete and at temperatures which are too high, the formation of slag and encrustations impedes continuous operation. A complete reaction requires the materials to be brought into contact or kept in contact with each other at the required temperatures for the period of time necessary to extract the fluorine from the solid materials. Extraction is preferably undergone by each part and each phase of the process stream. Finally, it is desirable to obtain the highest possible concentration of hydrofluoric acid as the pyrohydrolysis product. Only under these conditions does it become possible to economically conduct further processing to, for example, cryolite. At the same time, the consumption of energy and the contamination of the environment are kept at the lowest possible levels.

A special process for isolating very small quantities of fluorine from solid materials of low initial fluorine concentration is described in East German Pat. No. 111,357. The heated stream of material is subjected to a partially limited atmosphere with a high partial pressure of steam at temperatures above 600° C., which are produced in a rotating tube by means of a burner. The high partial pressure of the steam is produced in the rotating tube by a pulsating jet of water, which is directed onto the heated stream of material. The rotary motion of the furnace is intended to bring the steam into contact with all parts of the charge, so that fluorine is removed to a large extent.

This process permits pyrohydrolysis to be carried out at a relatively high partial pressure of steam. However, because of the pulsating water mass, this partial pressure is not continuously present. Moreover, a cooling effect, which is not conducive to carrying out the process in an economic manner is caused by the injection of large amounts of water into the reaction zone. It must also be pointed out that large amounts of heat are removed together with the pyrohydrolyzed material from the rotating tube. The pyrohydrolysis reaction of this process proceeds relatively slowly and consumes a great deal of energy.

It is an object of the present invention to control the gas and material flows during the pyrohydrolysis of fluorine-containing materials in a rotating tube so that the fluorine content of the starting material is separated as completely as possible in an energy-efficient manner and a pure, enriched product, containing little if any silica, is obtained.

In accordance with the invention, these objects are accomplished by contacting in countercurrent fashion in a rotary kiln, a carbon and fluorine-containing material with a rotating oxygen-steam mixture to partially pyrohydrolyze the material and subsequently treating this material with rotating steam to completely pyrohydrolyze the material.

The novel rotating gas streams of this invention are intended to produce a particular flow distribution throughout the reaction space so that the plane of rotation of the gas stream lies essentially at right angles to the direction of flow of the carbon and fluorine-containing solid. Two different gas streams are present:

1. a relatively hot oxygen-steam mixture, with which the carbon and fluorine-containing material is heated countercurrently and partially pyrohydrolyzed, and
2. a pure steam, with which the partially reacted material is pyrohydrolyzed completely and cooled countercurrently.

An oxygen-containing gas is injected into a transition zone in about the center of the reactive area of the kiln, between the pure steam reaction area and the oxygen-steam mixture reaction area. In so doing, a steep increase in temperature results from the combustion of water gas. A very good mass and heat transfer between the carbon and fluorine-containing material on the one hand and the steam-air mixture on the other is made possible by the procedures of the invention.

In carrying out the process in a rotary kiln, or pipe, two separate gas atmospheres are introduced; they are also separated from each other by the injection of a third atmosphere, the oxygen-containing gas. The reaction zone with the hot, oxygen-steam, oxidizing atmosphere, having an average steam content, is located at the upper end of the rotating pipe, while the reaction zone containing a reducing atmosphere and high steam content is located at the lower end of the pipe. The rotating pipe is tilted to provide about 2% and create a slight incline. The degree of inclination is adjustable and can be varied to meet differing process conditions. In the oxidizing zone, energy is released by the combustion of carbon and water gas. In the reducing zone, the water gas-carbon reaction takes place in proportion to the remaining carbon content of the starting material. This involves an endothermic reaction. The present process permits fluorine to be separated from the starting material over the entire length of the rotating pipe. An essentially fluorine-free solid product is obtained at the end of the reducing zone in the rotating pipe.

The heat required to meet the energy requirements of the endothermic reaction in the reducing zone is supplied by the solid material that was been heated to high temperatures in the oxidizing zone. The solids and the rotating steam are intensively mixed in the contact zone within the kiln without any appreciable amount of dust being created at the same time. Consequently, the dust content of the waste gas is kept to an extremely low level.

Through the specific injection of oxygen containing gas between the oxidizing and reducing zones, the position of the temperature maximum can be accurately controlled. This has a favorable effect on the economics of the process, because by controlling the position of the temperature maximum only a small portion of the heat is lost in the gaseous products of combustion or in the discharged solids. The particular method of controlling the process also prevents to a large extent any clinkering of the carbon and fluorine-containing materials, in spite of the relatively high reaction temperatures of from about 1200° C. to about 1800° C.

The process is further described with reference to an operating example of the invention.

BRIEF DESCRIPTION OF THE DRAWINGS

FIG. 2 is a diagrammatic representation of a longitudinal section of a rotating pipe reactor according to the invention.

DETAILED DESCRIPTION OF THE PREFERRED EMBODIMENT

Figure 1:
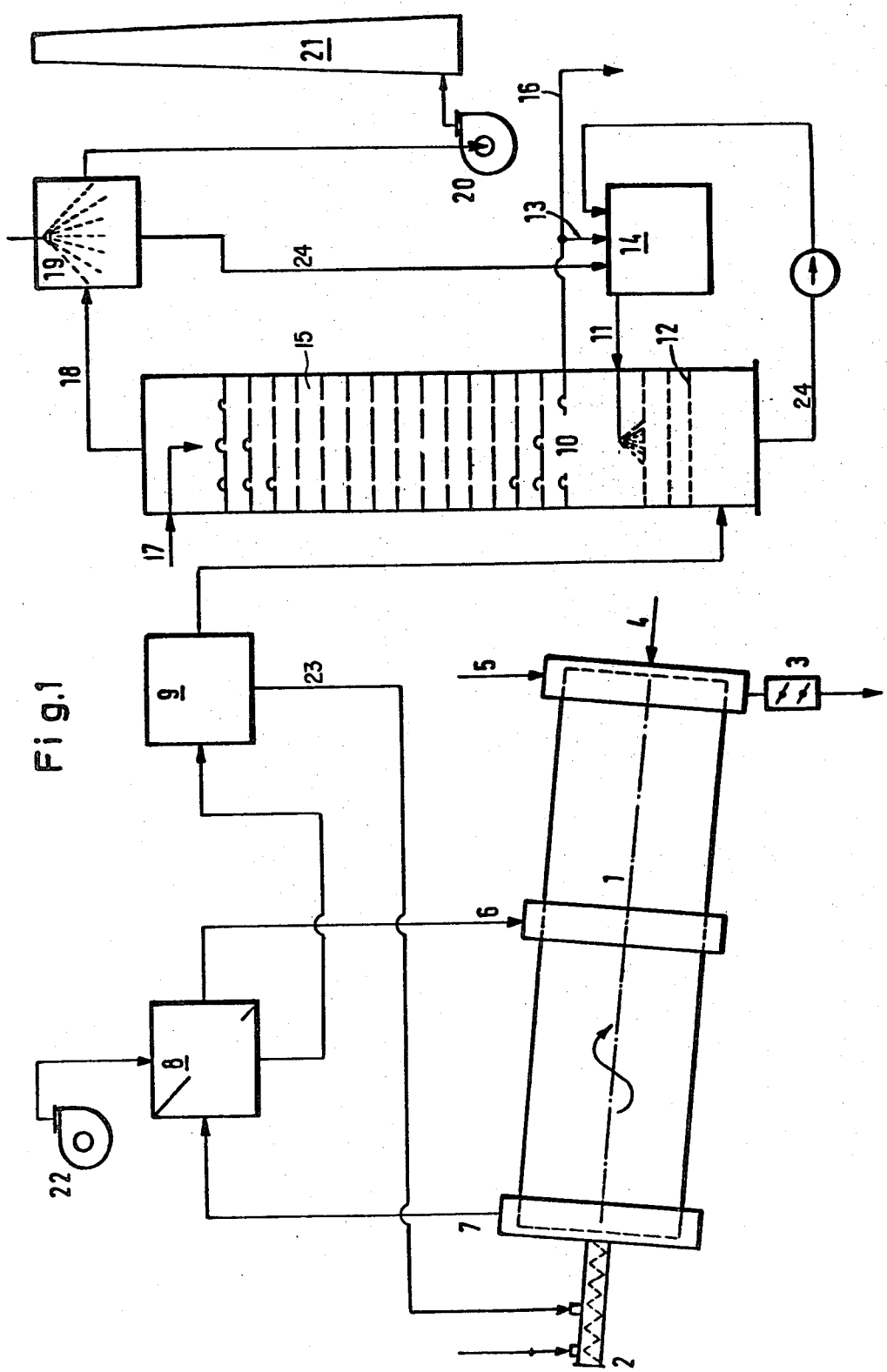
FIG. 1 is a schematic view of an installation for carrying out the process of the present invention.

FIG. 1 shows a rotating pipe reactor 1 with a feed screw 2 located at the upper end of the reactor for conveying carbon and fluorine-rich materials (e.g. waste products from the electrolysis of aluminum containing carbon, $Al_2O_3$, $Na_2O$ and fluorine) into the reactor. A swinging door 3 is provided at the lower end of the reactor for discharging reacted carbon and fluorine-free material. Primary steam, having a temperature of from about 200° C. to about 400° C. is fed through line 4 into the rotating pipe 1 and secondary steam, having a temperature of from about 120° C. to about 400° C. is fed through line 5. The inlet 6 for the oxygen-containing gas, for example, is located approximately in the center of the rotating pipe 1.

The hydrogen fluoride-containing gaseous products of combustion are drawn off over line 7 and supplied to the heat exchanger 8, at a temperature of from about 500° C. to about 700° C. The gas, which has been cooled in the heat exchanger 8 is passed through the fabric filter 9 at a temperature which will not consume the filter fabric. The purified gas from the fabric filter is supplied to the absorption unit 10. In the absorption unit 10, the gas is brought to the absorption temperature of between about 60° and about 100° C. with washing and quenching water from the recycling line 11. The gas is washed on rain sieve plates 12 to form an acid product. The acid product is removed through connection 16. The washing and quenching cycle is fed through line 13 with absorption water containing hydrofluoric acid (i.e., dilute hydrofluoric acid—approximately 30%) and purified in the gravity feed tank 14. In the absorption section 15 of the absorption unit 10, the absorption and quenching water flows via line 17 countercurrently to the gaseous products of combustion. The almost fluorine-free gaseous products of combustion are aspirated via line 18 into the washer 19 and from there compressed by the blower 20 into smokestack 21.

The blower 22 forces air through the heat exchanger 8 into the injection site 6. The solids deposited on filter 9, can be returned to the furnace by way of transport route 23. A portion of the wash liquor is supplied to the gravity feed tank 14 through line 24.

A mixture containing the starting material to be treated (usually ore or a mineral containing $Al_2O_3$ and fluorine) together with a chemically inert material which does not melt under the reaction conditions, (for example, burnt out material from pyrohydrolysis, sintered aluminum oxide granules and also sodium aluminate) is conveyed into the pyrohydrolysis furnace 1 by way of screw conveyor 2.

The proportion of inert material in the mixture is chosen so that the solids stream conveyed through the reaction zones has approximately the same heat capacity flow as the countercurrently flowing gaseous products of combustion. Reacted pyrohydrolysis product is preferably used as the inert material. The amount of gaseous combustion product is the sum of the air required for combustion and the amount of steam required for pyrohydrolysis.

In the rotary furnace 1, the solid mixture is heated by the countercurrently flowing gas to the ignition temperature of the carbon. The carbon is largely oxidized by the addition of oxygen and a portion of the fluorine compounds are split off. After the partially reacted product has passed the air-injection site 6, where it is heated to high temperature of between about 1200° C. and 1800° C., it enters an atmosphere which consists mainly of steam. As a result, the steam reacts with the remaining carbon, and completes the fluorine separation. Because this reaction is endothermic, the solid material, which has been heated to 1200°–1800° C., begins to cool. On being conveyed further toward the swinging door 3, the pyrohydrolysis product gives up a further portion of its heat to the countercurrently flowing steam. The remaining heat of the solids is further utilized for producing the steam required in the process.

The primary steam is injected tangentially, in the circumferential direction of the rotating pipe 1, and produces a turbulent flow throughout the entire rotating pipe. The secondary steam is heated by the particularly intensive heat exchange with the emerging solids. As already described, the steam reacts with the materials and initially forms water gas and hydrogen fluoride. By regulating the air flow into the secondary steam, the resulting water gas and the unreacted carbon can be oxidized directly and partially with the intermediate formation of water gas.

Before leaving the furnace, the gas gives off up to 80% of its heat to the solids. In this process, it is preferable to maintain a very high and turbulent flow of heat and material transfer. The fluorine-containing gaseous products of combustion which contain a slight residual amount of dust and hydrofluosilicic acid, are cooled in the heat exchanger 8 from about 500° C. to about 700° C. to a temperature which will not destroy the fabric filter and passed through the fabric filter. The residual dust and the hydrofluosilicic acid, which, under the conditions existing there, are largely decomposed to silica by hydrolysis, are deposited on the fabric filter 9.

In the succeeding absorption unit, the product which is almost completely free of dust and silica, is treated with dilute hydrofluoric acid. (10–15 molar). In this process, the silica and the residual dust are transferred to the quenching and washing cycle. The substances are prevented from accumulating excessively by the process of precipitation and deposition. The fluoride-containing wash solution from washer 19 is used for the precipitation.

In the absorption unit, fluorine-containing components are removed from the gaseous products of combustion by washing them countercurrently with absorption and quenching water. The acid product is removed from the fluorine-containing quenching and absorption water at the outlet of the absorption section 16. The quenching water is added to the circulating washing water in order to cover water losses from the quenching and washing cycles.

The essentially fluorine-free gaseous combustion products from the column are washed in an alkaline scrubber. If dilute sodium hydroxide is used for the washing step, sodium fluoride is formed. This solution may be partially used for precipitation of the silicic acid.

The heat, taken up by the heat exchanger 8, is utilized for preheating the combustion air and therefore permits high reaction temperatures. The combustion air is preheated here to a temperature of between about 300°–600° C. The dust from fabric filter 9 is mixed with the product in the screw conveyor 2.

As shown in FIG. 2, the lower head 30 of the rotating pipe is provided with a steam line 31 for the primary steam and a pipe connection 32 for the secondary steam. The steam line 31 discharges into a forked jet pipe 33, which is surrounded by a concentric gas-conducting pipe 34. The jets 29 are so arranged that the steam emerges tangentially relative to the rotating pipe 35 and the gas-conducting pipe 34. The concentric gas conducting pipe 34 is located so that the secondary steam must flow between the gas-conducting pipe 34 and the lining 36 of the rotating pipe. The generator plates 37 are mounted between the lining 36 of the rotating pipe. The generator plates 37 are mounted between the lining 36 of the rotating pipe 35 and the gas-conductng pipe 34. The arrangement of the plates 37 is similar to the arrangements of blades in an axial compressor in that the inclination of the generator plates 37 is selected with respect to the axis of the rotating pipe 35 so that a boosting effect is exerted on the solids in the feed section and an inhibiting effect in the discharge section (i.e., the generator plates act like worm gears in driving the reaction products—hence the degree to which the products are driven or boosted by the plates is dependent on the inclination (pitch) of the generator plates and the rotational speed of the pipe). In the central section, the generator plates are adjusted so as to have a neutral effect on the transport of the solids. The arrangement and the materials of construction of the plates 37 are selected so that, there is a particularly good heat transfer from the solids to the plates; heat can be stored rapidly there and given off once again. Heat transfer from the plates 37 to the steam is particularly intensive.

The generator plates are heated in the product flow (stream). After the generator plates have left the product, they travel into the gas flow and release their heat to the gas. In this manner, they can be cooled down to the maximum temperatures of the passing (circulating) steam. The obtainable maximum, minimum and main temperatures depend in particular upon the degree of fill (charge) and rate of revolution of the kiln as well as the weight and the surface area of the plates.

Approximately in the center of the rotating pipe 35, an oxygen containing gas, preferably air, tangentially enters the rotary kiln through duct assembly 38. The duct assembly provides that the turbulent flow of the mixture in the oven produced by the primary steam, is maintained and reinforced. The amount of oxygen as well as the number of connecting pieces, must also be controlled. The geometry of the air-entry duct is such that no solids are discharged there. At the upper head 39 of the rotating pipe, the solids to be treated are charged centrally by means of a screw conveyor 40. The connecting piece 43 for the gaseous products of combustion is connected by way of the head 39 of the rotating pipe with a relatively narrow concentric gas-outlet gap 41. The reacted material 44 leaves the furnace through the swinging door 42.

In a preferred embodiment the inlet opening 28 of screw conveyor 40 protrudes into the interior of the rotating pipe about the length of a radius of the rotating pipe 35.

The carbon and fluorine-rich material 45 is mixed with a predetermined quantity of inert material, which is preferably pyrohydrolyzed. The mixture is preferably in a ratio of between about 1:6 to 1:7, inert to carbon-containing materials. It is transported into the furnace by means of the screw conveyor 40. This mixture, whose heat capacity flow should be approximaely equal to that of the gaseous products of combustion, is heated by the gaseous products of combustion flowing in the opposite direction. The heat capacity flow is the production of the flow of material multiplied by the specific heat of the material. A strong tangential acceleration is produced by the rotating and axial flowing gaseous products of combustion as they enter the concentric gap of the gas-outlet opening 41. This gas outlet opening is disposed a distance of about one-half the radius of the rotating pipe from the inlet opening 28. Such a system prevents solids, which are being metered in by the screw conveyor 40, from immediately leaving the rotary kiln at once.

Upon being heated, the carbon and a portion of the fluorine-containing materials react with the air and steam. This reaction is exothermic and supplies the energy required for the process. The reaction reaches its highest temperature (between about 1200° and 1800° C.) as it passes the oxygen duct assembly 38. A pure steam atmosphere exists subsequently and leads to an endothermic water-gas reaction. At the high partial pressure of steam, of about 1 atmosphere, the separation of fluorine commences simultaneously. The water gas released flows into the upper portion of the rotating pipe and is oxidized. The product stream is cooled by these endothermic reactions as well as by the heat exchanged with the steam. As a result of the use of the regenerator plates 37, this heat transfer is particularly intensive. At the same time however, there is no significant dust development. The regenerator plates 37 are heated in the product stream until reaching the relevant time-induced average temperature, then give up their heat to the secondary steam and, in so doing, are cooled below the relevant time-induced average temperature.

The primary steam (temperature of 200°–400° C.), discharged into forked jet pipe 33, which is surrounded by gas conducting pipe 34, produces a turbulent flow which, together with the secondary steam, flowing between pipe 34 and rotating pipe lining 36 and the oxygen-containing gas which enters at duct 38, passes through the rotating pipe. The steam entering through the nozzles causes a turbulent rotating motion in the reactor which substantially enhances the exchange of material and heat. The turbulent flow makes it possible to set the heat transfer and material transfer conditions at very high values, independently of the axial velocity of the gas in the rotating tube 35. The steam pressure at the primary and secondary entry points is below 4 bar. This is the partial vapor pressure of the steam as it develops inside the oven. In the rear (discharge) end of the oven the partial vapor pressure may be close to one atmosphere. At the front (input) section of the oven, the vapor pressure is determined by the air/steam content of the atmosphere.

The axial velocity of the pyrohydrolysis gases is determined by the dimensions of the kiln and the gas quantities chemically required. For one, an oxygen containing gas, air, is required, for the other, a manifold of a stoichiometric gas quantity is necessary to expel the fluorine. Knowing the two gas volumes, together with the kiln geometry, enables calculation of the axial gas velocity. The axial gas velocity determines (under existing pipe reactor geometry) the residence time of the gas in the reactor. In pyrohydrolysis two contradictory requirements exist; on one hand it is desirable to have a sufficient gas residence time in the oven to provide sufficient time for gas to react with the solid; on the other hand it is desirable to have a high gas velocity to maintain heat and product exchange coefficients at optimum values. According to the present invention, a high absolute gas velocity with respect to the product and the walls of the revolving pipe is obtained by means of the rotating gas motion, while simultaneously enabling the residence time of the gas in the oven to be relatively long.

The axial velocity of the gas is a function of the flow of the gas volume and of the geometry of the rotating tube. The flow of the gas volume is determined by the stoichiometric combustion of carbon and its ratio to fluorine. By increasing the tangential components of the gas velocity, in the form of the turbulent flow, the process provides good material and heat transfer at the axial velocity.

The term "inert material" is used for that material which does not react under the conditions existing during pyrohydrolysis—the material which remains "inert." This includes corundum and sodium aluminate.

The high temperatures, existing in the center of the rotating tube, are produced by burning water gas. The amount of water gas is equivalent to the amount of carbon which reacts with steam in the reducing zone of the furnace.

If chips from elecrolysis cells for the production of aluminum are used as a starting material, the reacted solids, which consist essentially of aluminum and sodium as well as of the corresponding oxides, can be used once again in the Bayer process for the production of aluminum oxide.

What is claimed is:

1. Apparatus for the manufacture of hydrogen fluoride from carbon and fluoride containing solid materials, which comprises:
   a relatively hollow, cylindrical enclosure;
   means for rotating said enclosure about its longitudinal axis;
   said enclosure having an inlet for solid material reactants, an outlet for gaseous products and an outlet for solid products;
   a sleeve mounted coaxially within said enclosure at a first end of said enclosure, said sleeve provided with a series of radially extending heat-exchange plates, said plates having outer edges in spaced relation with the enclosure, said first end of said enclosure opposed to said inlet for said reactants:
   means for injecting steam circumferentially within said sleeve;
   means at said first end of said enclosure for injecting steam between said sleeve and said cylindrical enclosure;
   means for tangentially injecting oxygen into said cylindrical enclosure; said means disposed at an interior face of said enclosure, and positioned between said sleeve and said inlet.

2. Apparatus as described in claim 1 wherein said enclosure is disposed at an inclination whereby said first end is a lower end and a second opposite end is an upper end.

3. Apparatus as described in claim 2 wherein said means for injecting steam circumferentially is disposed in a first zone of said enclosure and said means for injecting oxygen is disposed at a second zone of said enclosure whereby steam and oxygen contact the reactant in a third zone of said enclosure.

4. Apparatus as described in claim 3 wherein said inlet is at the upper end of said enclosure, the outlet for gaseous products is at the upper end of said enclosure and said outlet for solid products is at the lower end of said enclosure.

5. Apparatus as described in claim 4 wherein said inlet for solid material reactants at said upper end is centrally positioned about the longitudinal axis of said enclosure and said outlet for gaseous products comprises a coaxial conduit concentrically disposed around said inlet.

6. Apparatus as described in claim 5 wherein said inlet projects axially into said enclosure a distance about equal to the radius of said enclosure.

7. Apparatus as described in claim 6, wherein the gaseous product outlet is disposed concentrically around the inlet at a distance from the opening of the inlet of about one-half the radius of the enclosure.

* * * * *